(12) United States Patent
Richter (10) Patent No.: US 7,638,929 B2
(45) Date of Patent: Dec. 29, 2009

(54) PIEZO-ELECTRIC MOTOR

(75) Inventor: Hans Richter, Augsburg (DE)

(73) Assignee: Berta Richter, Augsburg (DE)

( * ) Notice: Subject to any disclaimer, the term of this patent is extended or adjusted under 35 U.S.C. 154(b) by 17 days.

(21) Appl. No.: 12/157,144

(22) Filed: Jun. 9, 2008

(65) Prior Publication Data

US 2008/0238247 A1    Oct. 2, 2008

Related U.S. Application Data

(63) Continuation-in-part of application No. PCT/EP2006/011938, filed on Dec. 12, 2006.

(30) Foreign Application Priority Data

Dec. 14, 2005  (DE)  .................... 10 2005 060 164
May 1, 2006    (DE)  .................... 10 2006 020 566

(51) Int. Cl.
*H01L 41/08* (2006.01)

(52) U.S. Cl. ...................... 310/328; 310/311

(58) Field of Classification Search ............... 310/311, 310/328
See application file for complete search history.

(56) References Cited

U.S. PATENT DOCUMENTS

| 5,182,484 A | * | 1/1993 | Culp | 310/328 |
| 7,034,439 B2 | * | 4/2006 | Richter | 310/328 |
| 2006/0125350 A1 | * | 6/2006 | Audren et al. | 310/328 |

FOREIGN PATENT DOCUMENTS

| DE | 101 27 444 A1 | * | 4/2002 |
| WO | WO 00/17944 | * | 3/2000 |
| WO | WO 2007/068441 | * | 12/2006 |

* cited by examiner

*Primary Examiner*—Thomas M Dougherty
(74) *Attorney, Agent, or Firm*—Klaus J. Bach (57) ABSTRACT

In a piezo-electric motor with alternately electrically actuated clamping piezo packs arranged between a reference part and a drive part and with two stepping piezo packs arranged in an opposite sense and assigned to each clamping piezo pack or to one clamping piezo pack or a support structure, the stepping piezo stacks are connected via quasi-pivotal joint structures to a foot at locations which are spaced from each other in the longitudinal direction of the clamping piezo pack and from the drive part.

12 Claims, 6 Drawing Sheets

PIEZO-ELECTRIC MOTOR

This is a continuation-in-part application of pending international patent application PCT/EP2006/011938 filed Dec. 12, 2006 and claiming the priority of German patent applications 10 2005 059 495.6, 10 2003 060 164.2 and 10 2006 020 566.9 filed Dec. 12, 2005, Dec. 14, 2005 and Jan. 5, 2005 respectively.

BACKGROUND OF THE INVENTION

The invention relates to a piezoelectric motor particularly for use as a drive a motor for a vehicle or as a servo-motor and also for applications where a high drive power and/or high speeds as required. The piezoelectric drive can be a rotational drive or a linear drive.

A special and important field of application for the Invention resides in the use for example as electric motors for operating the brake discs in connection with hybrid motor vehicle drives.

A piezoelectric drive motor for high power applications which may be used for driving heavy loads is already known from WO 03/005 553 A2.

The piezoelectric drive described therein comprises a plurality of piezo packs in the form of stacks of piezo elements which are arranged between a relative stationary reference part and a drive part which is movable relative to the stationary part. The piezo packs provide for a selective generation of a clamping force between the reference part and the drive part and are therefore called clamping piezo packs. These clamping piezo packs are each connected with one end of the piezo element stack arrangement to the reference part and abut with the other end, the drive part without being firmly attached thereto. The orientation of the row in which the clamping piezo packs are arranged in side-by-side relationship is in a direction transverse to the relative movement between the drive part and the reference part.

Additional piezo packs which are also in the form of piezo element stacks and which are called stepping piezo packs because of their function are arranged with their stack height direction extending about normal to the stack height direction of the clamping piezo packs and are oriented in the direction of the relative movement between the reference part and the drive part. These stepping piezo packs are each connected with one end of their piezo element stack arrangement again at the reference part and connected with their other end to the end of a respective clamping piezo pack (or a respective sub-group of clamping packs) abutting the drive part.

There are two groups of clamping piezo packs and two groups of stepping piezo packs. They are electrically energized in such a way that in each case the one group of clamping piezo packs is energized, that is, expanded by the application of electric energy, whereby these clamping packs engage the drive part while the other group of clamping packs is de-energized that is in a release position in which they are not in clamping engagement with the drive part. Then the group of stepping piezo packs assigned to the clamping piezo pack which is energized is activated so that the respective stepping packs expand and, as a result, move the ends of the clamping packs engaged with the drive part by a certain distance in the direction of movement of the drive part. As a result, the drive part is moved by a corresponding distance relative to the clamping packs of the other clamping pack groups which are in their release position. Then the control is switched, that is, the previously energized clamping packs are de-energized that is switched to the release position, as well as the respective stepping piezo packs so that the clamping packs return to their original position while, at the same time, the other group of clamping packs is switched from its release position to its clamping position by energization thereof whereupon their stepping piezo packs are energized to activate them. In this way, the two groups of clamping piezo packs together with the associated stepping piezo packs provide, by their alternating energization, for a continuous series of steps for moving the drive part in a stepwise manner. Since the control of the piezo packs occurs in a frequency range of several kilohertz, for example, 25 kHz, a quasi-continuous movement of the drive part relative to the reference part is obtained.

In the piezo electric drive disclosed in WO 03/005,553 the reference part is connected to the stationary stack ends of the clamping piezo packets by way of a "semi-rigid" bridge plate. "Semi-rigid" means that the bridge plate adapts, at least in the length and expansion tolerance range of the clamping packs, in a static state to stack height differences of the clamping piezo packs by elastic bending, but, at the operating frequency, remains essentially rigid in the dynamic state. The reason herefor is that the movements of the piezo pack are very small. The available expansion length of a piezo pack is about one thousandth of the height of the pack. With a stack height of the clamping piezo pack of about 20 mm, an expansion length of about 20 micrometers is obtained. On the other hand, the tolerances of the mechanical components of the drive are in the range of hundreds of a millimeter even with highly precise manufacturing methods. Also, the stacking height of the piezo packs is subject to manufacturing tolerances so that, in a number of adjacently arranged piezo packs, they all have a different height within those tolerances. The arrangement according to WO 03/005 553 takes these facts into account by the provision of the semi-rigid bridge and in this way establishes the conditions for a practical functional capability of providing such a piezo electric drive which is suitable to generate a large drive power, because it provides for the necessary functional conditions that the clamping piezo packs between the reference part and the drive part are always maintained under high pretension since, with the available expansion stroke, the required clamping force and the friction force needed for the movement of the drive part could otherwise not be achieved. The drive part supporting the free ends of the clamping pack is stiff in relation to the semi-rigid bridge.

It is the object of the present invention to provide an improvement over the known principle of a piezo electric drive particularly with regard to an economical and practical manufacture of such piezo electric drives and, in view of the tendency of providing motor vehicles with hybrid drives. Hybrid drives can be selectively switched between an electric drive and an internal combustion engine. Piezo electric drives may also selected as electric drives in such hybrid concepts. Also the use of such electric drives in connection with vehicles equipped solely with internal combustion engines is being taken into consideration so that a further object of the invention resides in the provision of such a piezoelectric drive acting on a brake disc of a motor vehicle (or a similar drive disc).

An important point of the object presented above is that the arrangement of a piezoelectric motor is so selected that, depending on the application, small or large drive speeds or variable drive speeds can be generated. Also very high drive forces at low speeds can be generated.

SUMMARY OF THE INVENTION

In a piezo-electric motor with alternately electrically actuated clamping piezo packs arranged between a reference part and a drive part and with two stepping piezo packs arranged in an opposite sense and assigned to each clamping piezo pack or one clamping piezo pack or with a support structure, the stepping piezo stacks are connected via quasi-pivotal joint structures to a foot at locations which are spaced from each other in the longitudinal direction of the clamping piezo pack and from the drive part.

The arrangement according to the invention consequently resides in a particular design of the semi-rigid bridge as it is known in principle from WO 03/005 553 which comprises separate bridge elements, which are clamped together into frictional engagement or which may be an integral structure formed by bridge elements joined by material bridge members assigned each to one of the clamping piezo packs.

By selection of the geometry of the arrangement, particularly the relative positioning of the connection between the stepping piezo pack and the foot and between the foot and the abutment a "transmission ratio" adapted to the respective application between the stepping piezo excursion and the foot excursion can be adjusted at the connecting point thereof to the drive part.

For the application as a motor vehicle drive in accordance with the invention, it is particularly provided that in each case two stepping piezo packs are assigned to a clamping piezo packs and arranged in an opposite sense and have effective force lines and connecting points at a foot of the respective clamping piezo pack which are displaced in the stacking direction of the clamping piezo packs. Herein the distance between the connecting points of the stepping piezo packs at the foot of the clamping piezo packs is a multiple of the distance between the drive end of the foot and the connecting point closest thereto.

Because of the opposite excursion movements of the stepping piezo packs and the distance ratio of the distances between the two connecting points and the drive part and the closest connecting point, a mechanical lever transmission is achieved which increases the stepping stroke at the drive part with respect to the excursion stroke of the stepping piezo pack. In this way, with a corresponding operating frequency of the piezo pack when used as a motor vehicle drive with direct motion transmission to the wheel shaft for example by way of the brake disc, speeds of over 200 km/h, can be achieved. In addition by controlling a phase displacement of the oppositely acting stepping piezo packs the speed can be controlled in a simple manner.

The invention will become more readily apparent from the following description of particular embodiments thereof with respect to the accompanying drawing.

DESCRIPTION OF VARIOUS EMBODIMENTS

Figure 1:
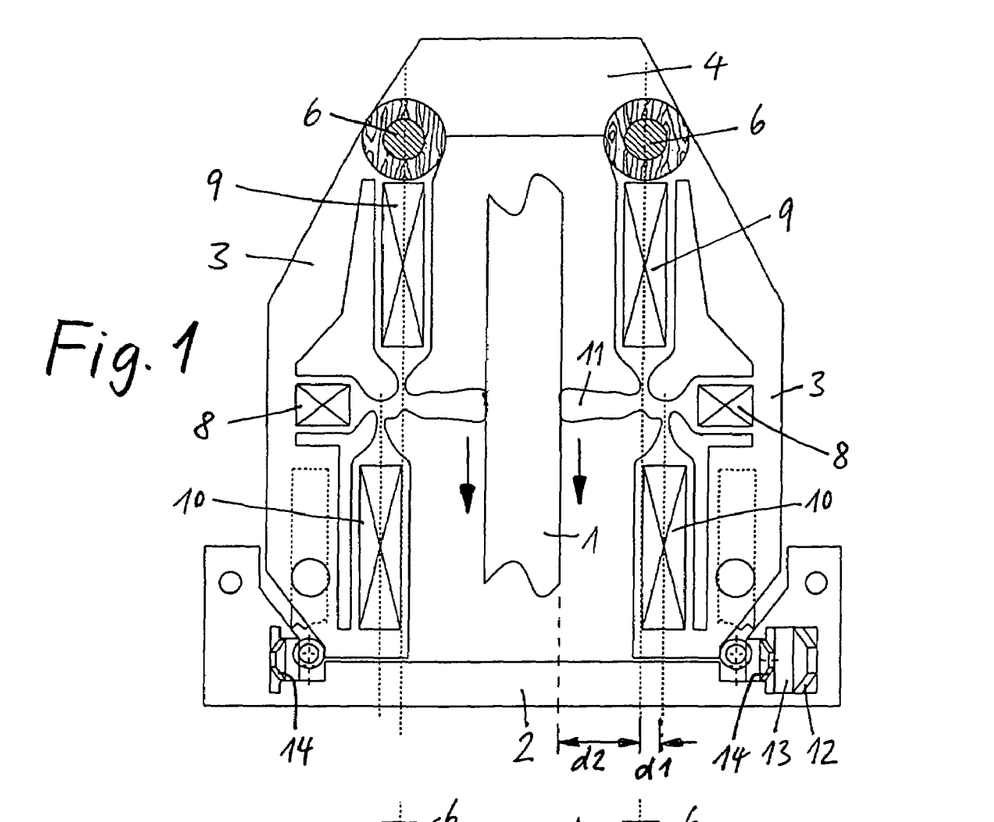
FIG. 1 is a schematic side view of a piezo-electric double drive effective on a disk.
Figure 2:
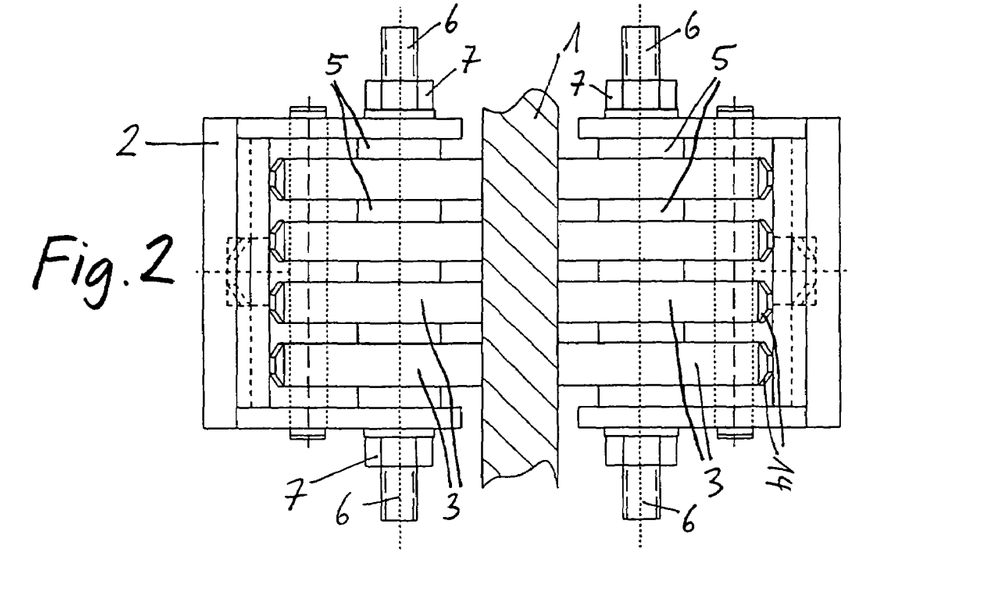
FIG. 2 is a front view of the drive arrangement shown in FIG. 1.

FIGS. 1 and 2 show in a side view (FIG. 1) and in a top view (FIG. 2) a piezo electric double drive which acts on both sides of a brake disc 1 or another drive disc. In FIG. 1, the brake disc is shown from a radial end thereof; in FIG. 2, it is shown in cross-section. The arrows in FIG. 1 indicate the direction of movement of the brake disc 1.

The piezo electric double drive as shown in FIGS. 1 and 2 comprises two individual drives which are arranged in a mirror-reversed manner at opposite sides of the brake disc 1 and which are interconnected by a common frame structure 2 forming a clamp.

Each individual drive comprises a series of four piezo stack arrangements with, in each case, one carrier element 3. In FIG. 1, for each drive only one such piezo pack arrangement with the associated carrier element 3 is visible in a side view; in FIG. 2 the arrangement of, in each case, four carrier elements 3 disposed side-by-side is visible, which include the respective piezo pack arrangement. The carrier elements 3 of the individual drives of the double drive are in each case interconnected by a bridge 4 so as to form a single piece as shown in FIG. 1.

The four carrier elements 3 of each row—as shown in FIG. 2—are clamped together by a threaded bolt 6 and clamping units 7 with distance washers 5 disposed therebetween. The carrier elements 3 of each individual drive clamped together in this way form a bridge element known in principle as "semi-rigid" bridge from WO 03/00553 A2 referred to in the introductory part.

Each carrier element 3 includes an arrangement of three piezo packs, that is, a clamping piezo pack 8, a first stepping piezo pack 9 and a second stepping piezo pack 10. The piezo packs 8, 9 and 10 are shown only schematically.

The clamping piezo pack 8 is arranged in a piezo stack arrangement extending normal to the plane of the brake disc 1 between the carrier element 3 and a support foot 11 supported on the brake disc 1. The two stepping piezo packs 9 and 10 have piezo element stack arrangements which extend parallel to one another and to the plane of the brake disc 1 and are each arranged between the carrier element 3 and the foot 11 wherein the connecting points with the foot 11 are displaced relative to one another in the longitudinal direction of the foot 11.

The distance between the connecting points or acting points of the two stepping piezo stacks 9 and 10 to the foot 11 is indicated in FIG. 1 by d1 and the distance between the brake disc 1 and the connecting point of the stepping stack 9 which is disposed closest to the brake disc to the foot 4 is indicated in FIG. 1 by the designation d2. The arrangement is in this way so selected that, upon activation of the two stepping piezo packs 9 and 10, their expansion strokes are added up and cause a corresponding angular deflection of the foot 11. The fact apparent from FIG. 1 that the distance d2 is a multiple of the distance d1 results in a corresponding lever transmission ratio providing for a movement of the end of the foot 11 at the brake disc 1, which is a multiple of the displacement length at the connecting point of the foot 11 to the stepping pack 9.

The feet 11 of all clamping piezo packs are tensioned in the static state by means of the frame 2 in a direction toward the brake disc 1, which is also shown in FIG. 1. Within the frame 2, a common, relatively strong tensioning spring 12 is arranged which acts on a movable intermediate plate 13. Between the intermediate plate 13 at one side of the frame and between the frame at the other side thereof and each of the carrier elements 3 another tensioning spring 14 is arranged. The arrangement of the carrier elements 3 acts therefore under dynamic conditions at the operating frequency like the earlier described "semi-rigid" bridge with the result that, with alternating energization of the clamping piezo packs of a first and a second double group of the altogether four piezo pack arrangements of each individual drive, always the energized pair of clamping piezo packs 8 is in frictional contact with the brake disc 1 whereas the respective other clamping piezo pack pair is momentarily disengaged from the brake disc 1.

As shown in the cross-sectional view of FIG. 1, the foot 11 is in the area of the connecting point with the stepping piezo pack 11 connected to the clamping piezo stack 8 via a "joint" formed by the reduced cross-sectional area. This joint permits an angular displacement of the foot 11 relative to the stack axis of the clamping pack 8.

The piezo pack arrangement described above with respect to FIG. 1 which includes two oppositely operating stepping piezo packs 9 and 10, which have parallel displaced acting lines and displaced connecting points to the foot 11 makes it also possible to control the speed and the direction of movement of the drive part, in this case, the brake disc 1 at a constant operating frequency of the piezo packs by controlling the relative phase position of the energization of the two piezo packs 9 and 10. It is necessary to maintain the energization frequency of (all) of the piezo packs so that the change-over between the supporting and non-supporting clamping piezo packs on the drive part, that is, the brake disc 1, remains continuously the same, independently of the speed of the drive part.

If both stepping piezo packs 9 and 10 are energized at the same phase, the expansion displacements are fully added up and the maximum stepping length of the foot 11 on the disc 1 is obtained. By changing the relative phase position of the energization of the two stepping piezo packs 9 and 10, taking into consideration the lever transmission ratio, the resulting stepping length of the foot 11 on the disc 1 and consequently the speed of the disc 10 can be changed. By changing the phase of the energization of the stepping piezo packets for controlling the clamping piezo packs also the directions of rotation of the disc can be reversed.

Furthermore, the piezo electric motor can operate as a generator when the brake disc 1 drives the motor or machine. Then, the piezo electric machine operating as a generator generates energy which can be stored in a battery and can later be utilized as drive energy for driving the motor. If the piezo electric motor is used for driving a motor vehicle, particularly in connection with a hybrid drive concept, the piezo electric machine can also be used for braking the vehicle during downhill travel or in connection with normal braking procedures. The hydraulic brake is then only used for rapid stops for example in connection with emergency braking procedures.

Figure 3:
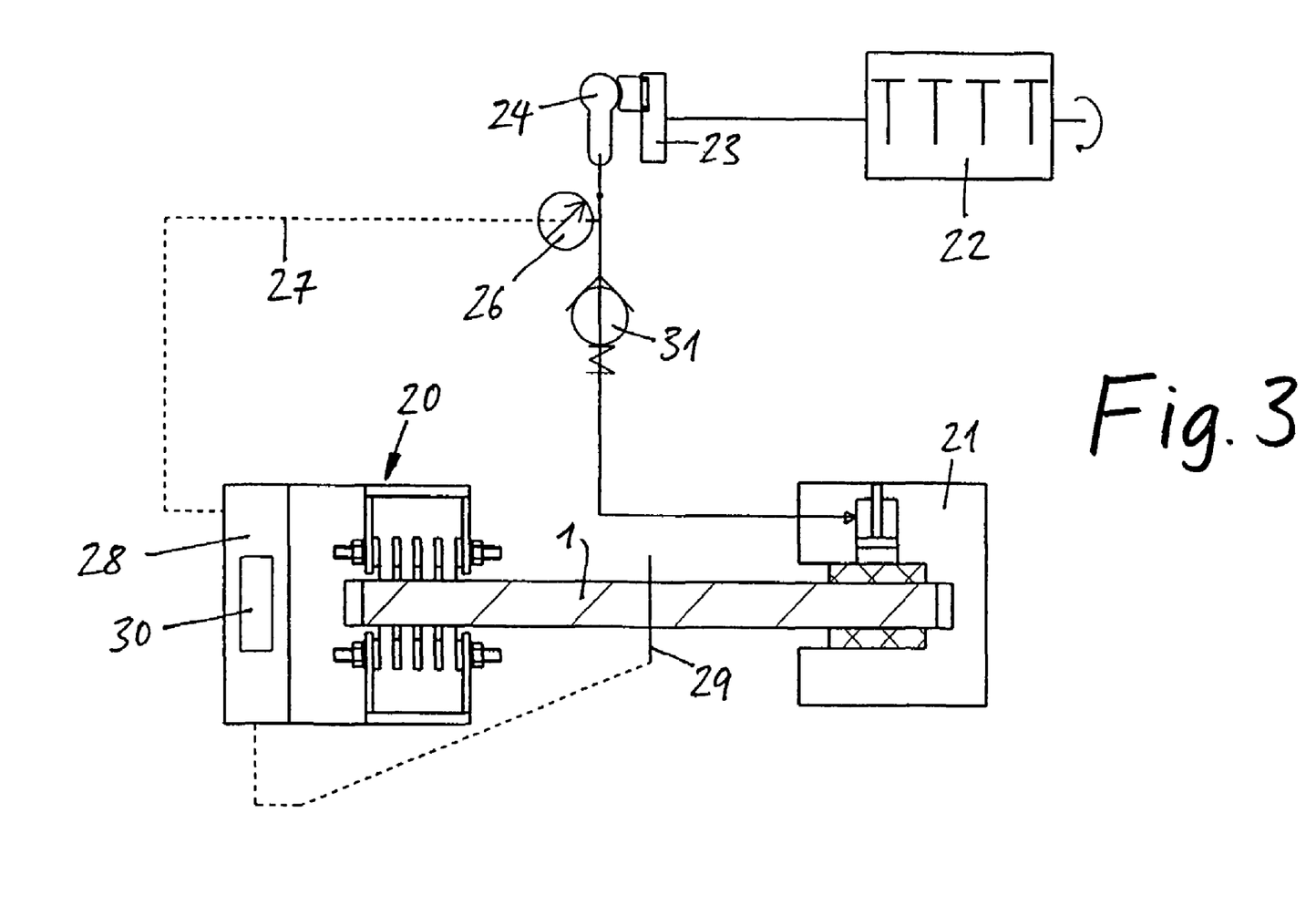
FIG. 3 shows schematically a hybrid drive arrangement using a piezoelectric drive according to FIGS. 1 and 2, FIGS. 4A and 4B show a side view and a front view of a piezoelectric drive according to the invention which acts as a rotational drive oh a drive shaft.

FIG. 3 shows, in the form of a block diagram, a hybrid drive arrangement for a motor vehicle using a piezo electric double motor according to FIGS. 1 and 2 acting on a brake disc.

The figure shows the brake disc 1 in connection with the piezo electric double motor 29 which is only schematically shown and also with a hydraulic brake 21 which also acts on the brake disc 1 and with an internal combustion engine 22 which is also shown only schematically. The gas pedal, or rather, the operating pedal is indicated by the reference numeral 23 and the brake pedal is indicated by the reference numeral 24. The switch-over between internal combustion engine operation and electric operation by way of the piezo electric motor 20 is not disclosed here since such switch-over arrangements for hybrid vehicle drives are well-known and are not part of the present invention.

When the vehicle is operated by the internal combustion engine 22, the piezo electric motor is disengaged, that is, it is disengaged from the brake disc 1. How the disengagement arrangement is realized will be described later.

When the vehicle is driven by the piezo electric motor 20, the motor can also be used as an operating brake and then as a generator which generates electricity rather than using it. The brake line 25 is provided with a brake pressure sensor 26 which is connected to a controller 28 via a control line 27. The controller 28 responds to the braking pressure and additionally received a rotational speed signal from a speed sensor 29 which detects the rotational speed of the brake disc 1 and, dependent thereon, controls the operation of the piezo electric motor 20, particularly the phase position for the energization of the stepping piezo packs. Also shown schematically as a block within the controller 28 is a battery 30 or a battery arrangement which of course may not be physically arranged in the controller but at any suitable location and which supplies electrical energy to the piezo electric motor 20 or, respectively, for braking the brake disc with the piezo electric motor 20 operating as a generator receives and stores electric energy.

During strong braking procedures, particularly during emergency braking where the braking pressure increases to a large value, an overpressure valve 31 arranged in the brake line 25 opens so that then also the hydraulic brake 21 is pressurized and activated.

Figures 4A, 4B:
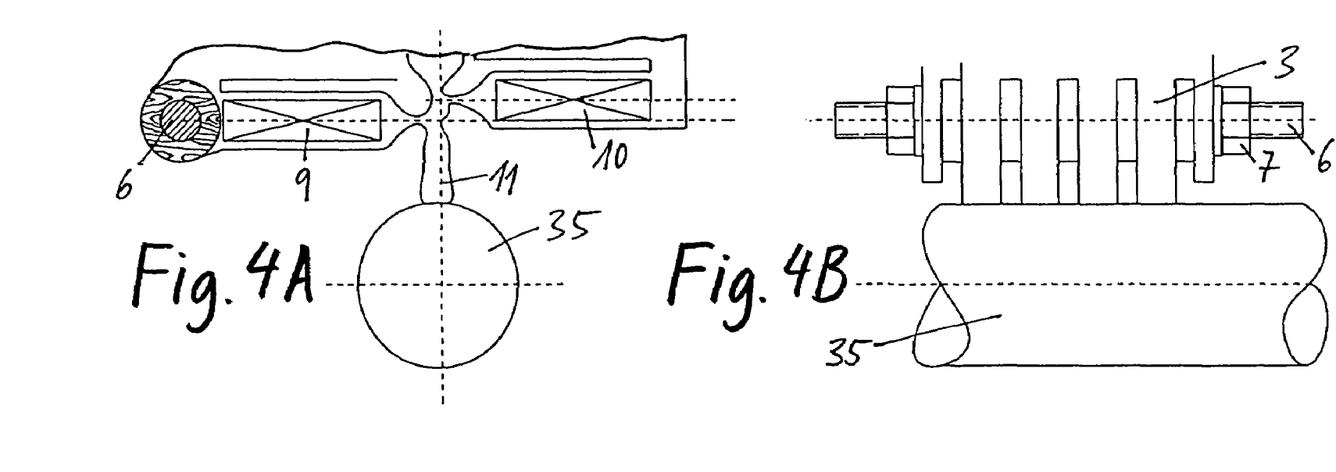
Figure 5A:
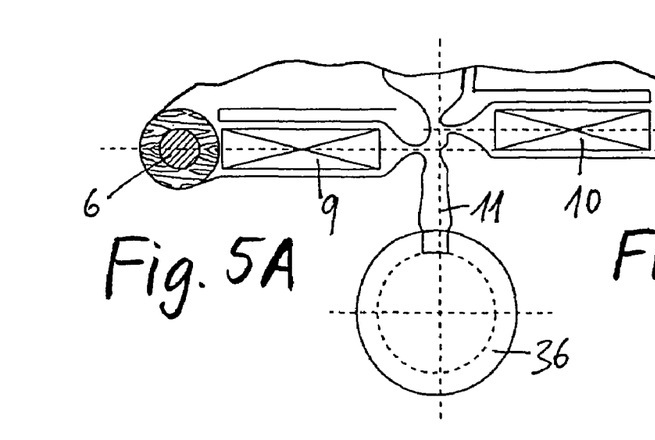
FIGS. 5A and 5b show side and front views of a piezoelectric drive according to the invention which acts on a threaded spindle and is usable as a control drive.
Figure 5B:
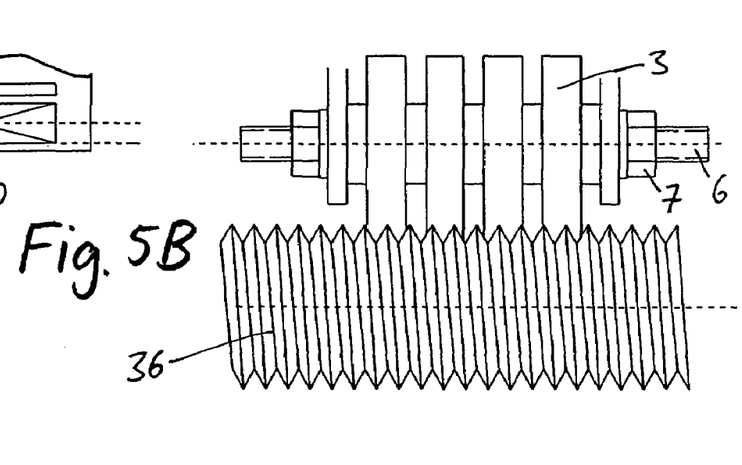

The FIGS. 4A and 4B show in a side view (FIG. 4A) and in a front view (FIG. 4B), the use of a piezo electric drive for rotating a shaft 35 wherein the piezo drive is shown only partially. FIGS. 5A and 5B also show in the side view (FIG. 5A) and in the front view (FIG. 5B), the use of such a piezo-electric drive for rotating a threaded spindle 36 wherein the feet 11 of the clamping pack engage into the thread recesses of the threaded spindle 36. Such an arrangement is suitable for a control drive providing high control forces.

In the FIGS. 4A, 4B, 5A, and 5B, the piezo pack arrangement is not fully shown but only sections are shown since the arrangement is identical with the arrangement of each individual drive as shown in FIG. 1. It is noted that also for this application for rotating a shaft or a spindle, expediently a double drive in the form of two diametrically opposite piezo electric individual drives can be used in order to compensate for the pressure forces of the clamping piezo packs on the shaft or respectively, the spindle outer circumference.

Figure 6A:
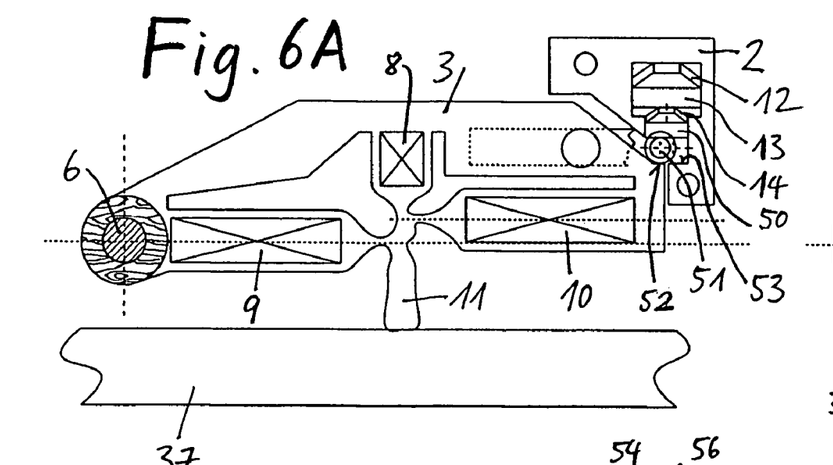
FIGS. 6A and 6B show a side view and a top view of a piezoelectric linear drive according to the invention.
Figure 6B:
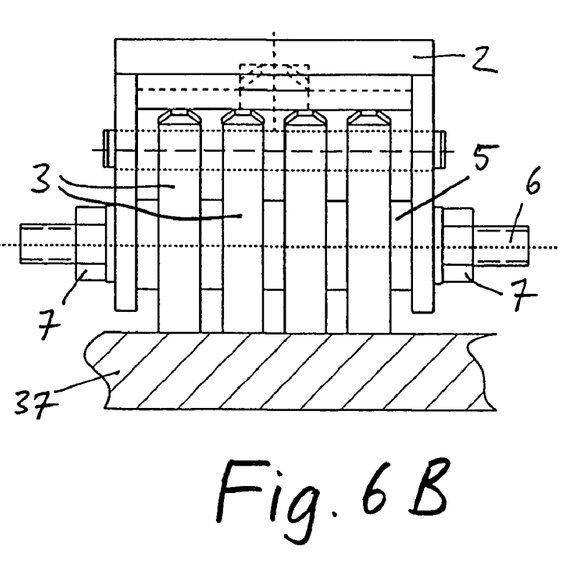

The FIGS. 6A and 6B show in a side view (FIG. 6A) and in a front view (FIG. 6b), a piezo electric drive according to the invention which is designed as a linear drive and shown as an individual drive but which may also be a double drive. The arrangement corresponds again to the arrangement of each individual drive as shown in FIG. 1 wherein the frame 2, here in the form of a clamping frame, is designed only for the pre-tensioning of the carrier elements 3 of an individual drive, but, with a double drive as shown in principle in FIG. 1, can be in the form of a common frame. The drive part is shown here as a plate 37 but it could also be a track or a rod.

For all arrangements, it can be said: Whereas in the shown embodiments the piezoelectric drive or, better expressed the piezo pack arrangements, are arranged at the stator that is relative to the stationary reference part of an arrangement and the feet 11 of the clamping piezo stacks act on the drive part, the arrangement may basically also be kinematically reversed in such a way that the piezo pack arrangements are disposed on the drive part that is at the movable part and the legs 11 of the clamping packs are supported on the reference part and move the drive part relative to the reference part.

The piezo electric drive as shown in all figures includes also a release arrangement which provides for a release of the engagement of the piezo electric motor from the brake disc 1 or another drive member for example, as already mentioned, when the vehicle is driven by the internal combustion engine. The design and operation of such a release arrangement will now be described on the basis of FIGS. 6A and 7. The release arrangement is also shown in FIG. 1 but is not provided with reference numerals for reasons of clarity.

As shown in FIG. 6, each spring 14 does not engage directly the respective carrier element 3 but acts on it via a pressure member 50 and a roller 51. The roller 51 is disposed on a shoulder 52 of the carrier element 3.

Figure 7:
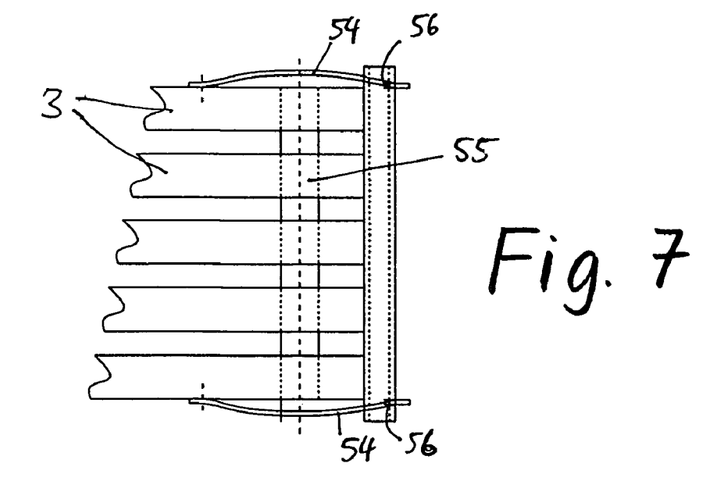
FIG. 7 shows a release arrangement for uncoupling the clamping piezo pack engagement.

As further apparent from FIG. 6A, the frame 2 includes a shoulder 53 disposed at the same level as the shoulder 52 of the carrier element. The rollers 51 of all the carrier elements 3 are movable via a common operating rod between a normal position in which it is disposed on the shoulder 52 of the respective carrier element 3 and a position displaced in FIG. 6A toward the right, so as to be disposed on the shoulder 53 of the frame 2. This occurs by means of leaf springs 54 which are shown in the top view of FIG. 7 showing the support elements. The two leaf springs 54, which are shown in the top view of FIG. 7 showing the support elements. The two leaf springs 54 are pre-tensioned in the outwardly curved normal position as shown in FIG. 1. A selectively operable electromagnet 55 which is only schematically shown in FIG. 7 attracts the two leaf springs when energized so that the leaf springs 54 straighten out. These leaf springs which are fixed at one end to the carrier elements 3 (or at a suitable point of the frame) and at the other end to a rod connected in each case to an axial end of the rod operating the rollers 51 then act like an elbow lever. When the leaf springs 54 are stretched by attraction by the electromagnet 55, the connecting points 56 with the rod are moved to the right become of the greater stretching length of the leaf springs 54 as shown in FIG. 7 which results in a movement of the roller 51 shown in FIG. 6A from the shoulder 52 of the carrier element 3 onto the shoulder 53 of the frame 2. But then the carrier elements 3 are no longer supported and pre-tensioned against the drive element, which is in FIG. 6A the plate 37, so that the drive element is freely movable under the feet 11 of the piezo pack arrangement.

Figure 8:
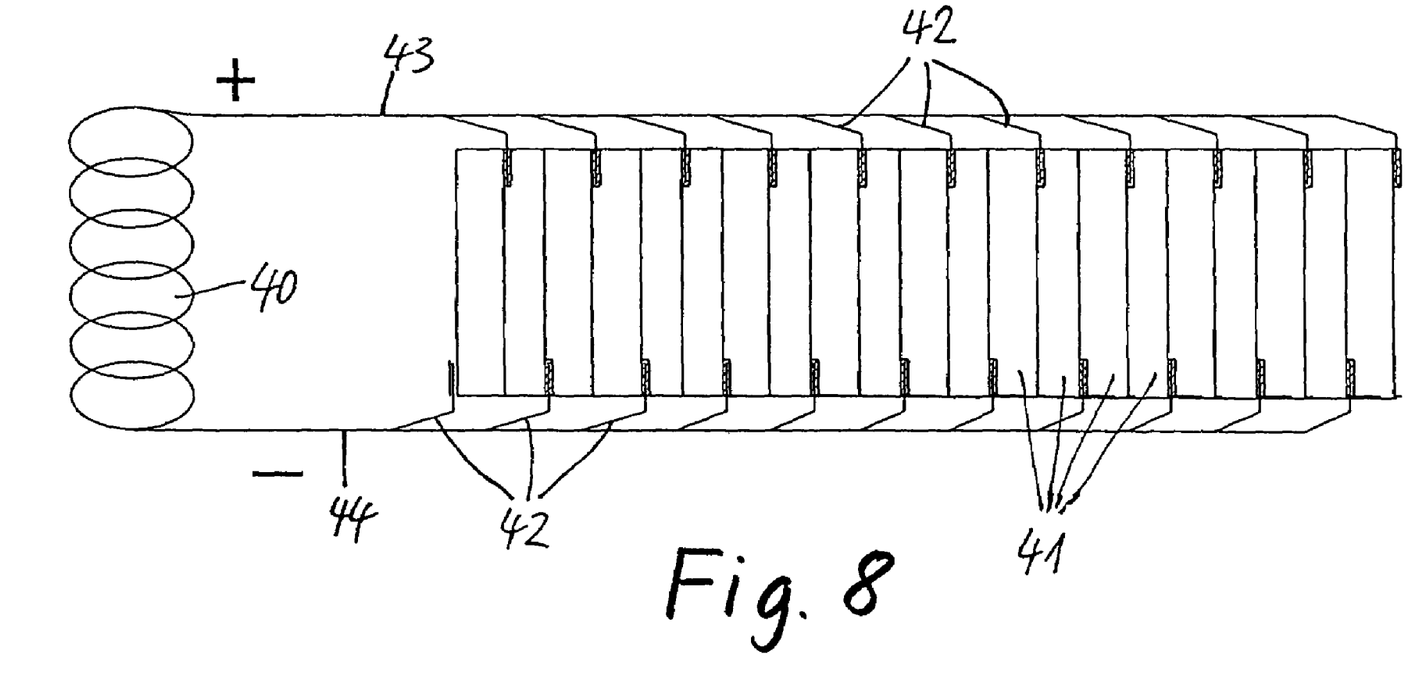
FIG. 8 is a schematic representation of the electric connecting arrangement for the piezo elements of the piezo magnet pack for a piezo electric drive according to the invention.

FIG. 8 shows in principle, the arrangement of a piezo pack in the form of a piezo element stack with its electrical connections and the electric control arrangement.

The electric control arrangement is in the form of an LC oscillating circuit including an oscillating coil 40 and the piezo elements 41 forming capacitances. With this control arrangement only the energy consumed in the oscillating circuit must be re-supplied whereas the basic exchange of energy as needed for the expansion and the contraction of the piezo packs occurs within the oscillating circuit.

Important in the arrangement shown herein is the fact that the connector flags 42 extending from the separation layers between the piezo elements 41 are connected to a common conductor 43 or respectively, 44 only at a distance from the piezo pack, so that the connecting flags 42 accommodate the expansion oscillations of the piezo pack and the connecting points with the common conductor and the connecting points of the connecting of the connecting lines to the piezo elements are not subjected to oscillation stresses.

The connecting flags 42 have preferably each the same width as the piezo electric elements so that they have a relatively large surface. They serve consequently also as heat sinks for the removal of the heat generated in the piezo elements. The connector flags 42 are, contrary to present practice, not only connected at the edges of the piezo elements but, as copper foils, extend into the piezo stack as clearly shown in FIG. 8 in order to provide for better heat removal and, in addition, to be able utilize skin effects.

Figure 9:
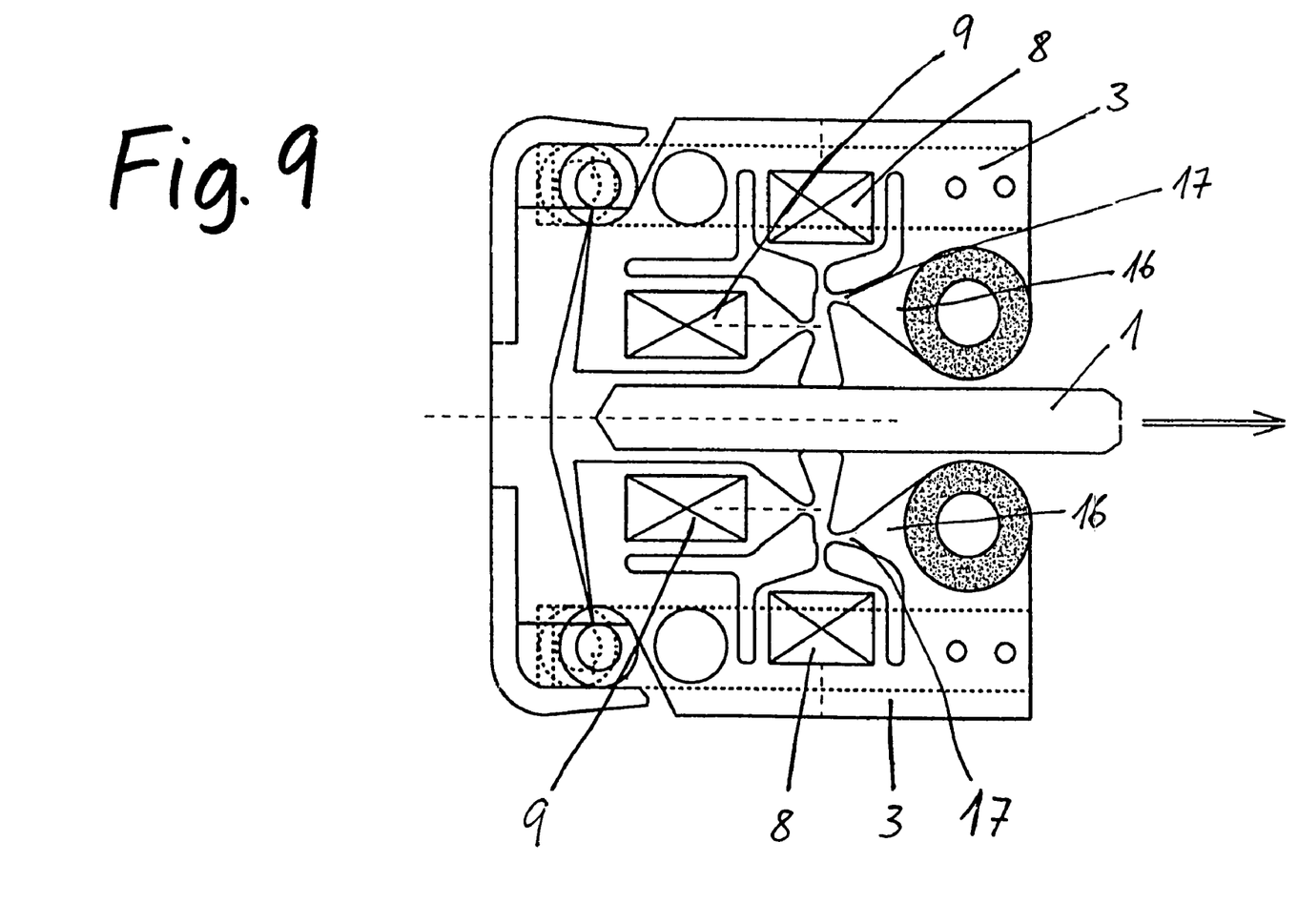
FIG. 9 is a representation similar to FIG. 1 with a somewhat simplified embodiment of the piezo motor arrangement.

FIG. 9 shows in a side view in a way similar to that of FIG. 1 a double drive with piezo electric motors which act on both sides of a brake disc 1 or another drive disc. However, the arrangement of the piezo motors is somewhat simplified in comparison with the arrangement of FIG. 1. In this arrangement according to FIG. 9, each clamping piezo pack 8 includes only one stepping piezo pack 9. The second stepping piezo pack 10 of FIG. 1 is replaced by a rigid support member 15 on the reference part 2. The support structure 16 is connected to the foot via a quasi-joint 17 which is somewhat spaced from the connection of the foot 11 to the clamping piezo pack. The connection between the stepping piezo pack 9 and the foot 11 is also established via a quasi-joint at a certain point between the connection to the support structure 16 and the foot end which is in engagement with the drive part 1. By the selection of the relative positioning of the connecting point of the foot 11 to the stepping piezo pack 9 and the support structure 16 the drive transmission ratio, that is, the ratio of the expansion length of the stepping piezo pack to the stepping length of the foot end connection with the drive part can be selected or adjusted.

With the embodiment according to FIG. 9, there is, compared to the arrangement of FIG. 1, a loss of maximum speed and also a loss concerning the capability of controlling the speed by phase displacement of the expansions of the stepping piezo packs 9 and 10, but the simplified arrangement as shown in FIG. 9 is less expensive and smaller and is quite sufficient for many applications.

In all embodiments, the speed control can occur by varying the control frequency for the clamping and the stepping piezo packs. Of course, this can be done only within certain limits which are given by the functions or the behavior of the semi-rigid bridge and also by changing the stroke of the stepping piezo packs, that is, their expansion, by changing the energization voltage of the stepping piezo packs.

In accordance with the present invention, it is also possible to change the rigidity of the semi-rigid bridge by means of an adjustment mechanism which is not shown in the drawings, in order to adapt the rigidity for example to the selected control frequency of the piezo pack or to other operating conditions. Such an adjustment of the rigidity of the semi-rigid bridge can be achieved by changing the carrier elements 3 forming the bridge elements by using, instead of a non-variably fixed clamping mechanism (for example, a clamping bolt, a plate spring pack or similar device) with a fixed clamping force, another piezo actuator which, by variable application of a voltage affecting its degree of movement, is more or less expanded and, as a result, applies a more or less strong tensioning pressure to the bridge elements. Since, for such a tensioning change, very small extensions are sufficient, an adjustment mechanism involving a piezo actuator is very suitable.

What is claimed is:

1. A piezo electric motor for generating a relative movement between a reference part (2) and a drive part (1), comprising:

a plurality of clamping piezo packs (8) arranged between the reference part (2) and the drive part (1), said clamping piezo packs (8) being oriented so as to extend about normal to the direction of a relative movement between the drive part (1) and the reference part (2) and supported each with one end to the reference part (2) and at the opposite end being disposed with a foot (11) in frictional engagement with the drive part (1), the clamping piezo packs (8) comprising at least two groups which are alternately electrically energized, a bridge member which is supported under pretension on the reference part (2) and which is semi-rigid such that, in a static state, it is sufficiently flexible for accommodating length tolerances of the clamping piezo pack, but acts rigidly when dynamically loaded by the piezo forces at the piezo operating frequency, a plurality of stepping piezo packs (9, 10) of which each is assigned to a clamping piezo pack (8) and arranged about parallel to the direction of the relative movement between the drive part (1) and the reference part (2) and are fixed each with one end at the reference part and having an opposite end which is connected to the foot (11) of the associated clamping piezo pack (8), said clamping piezo pack (8) being connected each with the respective foot (11) via a quasi-joint, and the foot (11) being further connected via another quasi-joint to a counter support structure (16) at a location, which is spaced from the connecting point to the respective clamping pack (8), the respective assigned stepping piezo pack (9) being connected to the foot (11) at a location disposed between the connecting point to the support (16) and the drive side end of the foot (11) or the connecting point with the clamping piezo pack.

2. A piezo electric motor according to claim 1, wherein the support structure (16) is a second stepping piezo pack (10) such that the two stepping piezo packs (9, 10) are oriented in an opposite sense, and that their actuation lines are displaced in the longitudinal direction of the respective clamping packs (8), and the connecting points of the two stepping piezo packs (9,10) to the foot (11) are spaced from each other in the longitudinal direction of the clamping piezo packs (8) and from the point of engagement of the foot (11) with the drive part (1).

3. A piezo electric motor according to claim 1, wherein the quasi-joints of the foot (11) with the clamping piezo pack (8) are formed by a reduced cross-section area of the foot (11).

4. A piezo electric motor according to claim 2, wherein the distance between the end of the foot (11) engaging the drive part (1) and the stepping piezo pack connecting point closer to the drive part is a multiple of the distance between the connecting points of the two stepping piezo packs (9, 10) to the foot (11).

5. A piezo electric motor according to claim 2, wherein the two stepping piezo packs (9, 10) are energizable in synchronism with the clamping packs (8) but are energizable relative to each other and to the clamping pack with an adjustable phase displacement.

6. A piezo electric motor according to claim 1, wherein the semi-rigid bridge structure is divided into a plurality of individual members (3) each assigned to a clamping piezo pack (8) and the individual members (3) are joined by firm frictional engagement.

7. A piezo electric motor according to claim 6, wherein the individual members (3) of the semi-rigid bridge structure are clamped together at points displaced sidewardly from the longitudinal axis of the clamping piezo pack (8) in the direction of the relative movement between the drive part (1) and the reference part (2) and connected to the reference part (2) under compressive tension at one side after the other.

8. A piezo electric motor according to claim 6, wherein each member (3) of the bridge structure forms a carrier element accommodating the respective clamping piezo pack (8) and the two respective stepping piezo packs (9).

9. A piezo electric motor according to claim 1, including a double arrangement of individual motor arrangements which are disposed in a mirror-reversed fashion or diametrically at the opposite sides of the drive part (1, 35, 36, 37) and which are interconnected by way of a common reference part (2).

10. A piezo electric motor according to claim 9, having two individual motor arrangements which act on the two sides of a rotating wheel drive or brake disc of a vehicle.

11. A piezo electric motor according to claim 10, which motor acts on a wheel brake disc of a motor vehicle, including an electric control arrangement (28) which senses the brake pressure in a brake line of the vehicle via a pressure sensor and, dependent thereon, switches the piezoelectric motor to generator operation driven by the brake disc while storing the electric energy generated in a battery.

12. A piezo electric motor according to claim 6, wherein the clamping of the individual members (3) of the semi-rigid bridge occurs with a variable force by use of a piezo pack.

\* \* \* \* \*